United States Patent [19]
Asbeck et al.

[11] Patent Number: 5,066,504
[45] Date of Patent: Nov. 19, 1991

[54] DEWAXING OF DRIED OIL

[75] Inventors: Lutz S. Asbeck, Delmenhorst, Fed. Rep. of Germany; Jacobus C. Segers, Nieuwerkerk a/d IJssel, Netherlands

[73] Assignee: Van den Bergh Foods Co., Division of Conopco, Inc., Lisle, Ill.

[21] Appl. No.: 513,716

[22] Filed: Apr. 24, 1990

[30] Foreign Application Priority Data

Apr. 28, 1989 [GB] United Kingdom ............... 8909804

[51] Int. Cl.$^5$ .............................................. A23D 9/00
[52] U.S. Cl. .................................. 426/417; 204/186; 426/601
[58] Field of Search ................ 426/417, 601; 204/186

[56] References Cited
U.S. PATENT DOCUMENTS 4,200,509  4/1980  Seguine ............................. 204/186

*Primary Examiner*—Donald E. Czaja
*Assistant Examiner*—Leslie Wood
*Attorney, Agent, or Firm*—Rimma Mitelman

[57] ABSTRACT

The invention relates to a method for dewaxing oil, comprising steps of:
  i) drying the oil to a water content of less than 0.5% by wt;
  ii) heating the oil to a temperature at which the oil does not contain nucleation seeds for wax crystal formation;
  iii) cooling the dried oil from the temperature at which it does not contain nucleation seeds for wax crystal formation, at a cooling rate of less than 15° C. per hour and at a temperature difference between the oil and the coolant medium of less than 15° C., to an oil end temperature being in the range of 2°–10° C. wherein a solid wax is formed; and
  iv) removing the solid wax by microfiltration.

9 Claims, No Drawings

DEWAXING OF DRIED OIL

BACKGROUND OF THE INVENTION

The present invention relates to a method for dewaxing oil, in particular to a dewaxing method in which the oil is pre-dried and after the formation of solid wax by cooling, the solid wax is removed by microfiltration.

Oils, extracted from vegetable and animal tissues, contain a number of impurities, which have to be removed in order to make the oil suitable for human consumption. One type of impurities consists of waxes, which are high melting esters of fatty alcohols and fatty acids, having a low solubility in oils. These waxes make the oil cloudy at lower temperatures. The quantity of waxes in crude oils varies from several hundred ppm to several thousand ppm. The wax content has to be reduced to a level of about 10 ppm or less, so that the cold stability of the oil is improved.

A method for dewaxing oil consists of carefully cooling the oil, followed by crystallization of the wax, which is then removed by centrifugation or filtration.

G. Haraldsson describes in a publication entitled "Degumming, dewaxing and refining" in JAOCS, vol. 60, page 203A–208A, several dewaxing processes, in which oil to be dewaxed is mixed with 4–6% by wt water, so that a soapy water phase is formed, which is easily removable by centrifugation.

K.-H. Brunner discloses in a Westfalia brochure entitled "New process developments in the field of edible oil refining with centrifugal separators" a dewaxing process which takes place after caustic refining. The oil is mixed with a certain amount of water, so that an optimal separation of the phases after crystallization is obtained. Crystallization takes place at about 5° C. and a holding time of 6–8 hours. The crystallized wax is removed by centrifugation.

G. Rivarola et al discloses in an article entitled "Crystallization of waxes during sunflowerseed oil refining" in JAOCS, vol 62, page 1508–1513, specific dewaxing conditions so that the separation of the crystallized wax is improved. These optimal crystallization conditions comprise low cooling rates and low temperature differences between the oil and the coolant medium. It is recommended to add water to the oil to be dewaxed in order to improve wax separation in the aqueous phase.

Finally, DE-C-3,312,573 discloses a dewaxing method, in which after wax crystallization the wax crystals are removed by microfiltration using a microfilter having pore diameters of 0.05 to 5 $\mu$m. The oil to be refined has a water content of 2.4% by wt.

SUMMARY OF THE INVENTION

It has been found that the dewaxing processes according to the prior art mentioned above may be improved if the oil to be dewaxed is dewatered and subjected to specific crystallization conditions resulting in relatively large wax crystals, which in turn are separated by microfiltration, resulting in a significantly higher filtration rate. The dewaxed oil obtained shows a better performance in the cold test (24 or 48 hours at 0° C.).

The process according to the invention comprises the steps of:

i) drying the oil to a water content of less than 0.5% by wt;

ii) cooling the dried oil at a cooling rate of less than 15° C. per hour and at a temperature difference between the oil and the coolant medium of less than 15° C., to an oil end temperature being in the range of 2°–10° C.; and iii) removing the solid wax formed by microfiltration.

Preferably the oil is dried to a water content of less than 0.1% by wt. The oil may be dried in advance or during or after heating the oil to a temperature at which the oil does not contain nucleation seeds for wax crystal formation, which temperature varies in dependence of the type and grade of the oil to be dewaxed.

Preferably the cooling rate is equal to or less than 10° C. per hour, most preferably the cooling rate lies within the range of 5°–8° C. per hour. The temperature difference between the oil and the coolant medium is preferably equal to or less than 10° C., more preferably within the temperature range of 5°–10° C. The oil end temperature within the temperature range of 5°–8° C.

The crystallization mechanism may be divided in two steps, namely a nucleation step in which wax crystal seeds are formed, and a wax crystal growth step. The driving force is super-saturation, and crystallization starts after cooling the oil below the solubility temperature of the wax in oil. The nucleation rate is determined by super-saturation, whereas the crystal size is controlled by the nucleation rate. In other words: the number of wax crystal seeds determines the dimensions of the wax crystals. A relatively low cooling rate and a relatively small temperature difference between the oil to be dewaxed and the coolant medium, are conditions resulting in relatively large wax crystals, which are more easily removable.

It was very surprising to find that subjection of pre-dried oil to these crystallization conditions resulted in wax crystals that may be removed by microfiltration at significantly higher filtration rates, and that the product exhibits an improved cold test performance.

Furthermore, after crystallization the oil may be directly subjected to the microfiltration without allowing any maturation time period.

Oils suitable for the dewaxing process according to the invention comprise sunflower oil, maize oil, rape seed oil, cottonseed oil, olive oil, palm oil, coconut oil, soyabean oil and the like.

The dewaxing method according to the invention will be illustrated in an experiment, in which two different types of microfilters are used.

A first microfilter is a microfiltration module having a filtration area of about 0.2 m$^2$. This module is manufactured and available from Asahi Chemical International Limited in Japan, marked under the trade name Microza TP-113$^R$. This module consists of a housing containing a package of about 100 hollow fibres made of a symmetric, synthetic polymer membrane having a nominal pore diameter of 0.2 $\mu$m. The hold-up of the module is about 0.37 liter.

The second type of microfilter is a sintered metal filter produced by Loeffler Filter Technik GmbH, West-Germany. This filter consists of a stainless steel housing containing a sintered stainless steel filter candle having a filtration area of about 0.18 m2 and a nominal pore diameter of 0.5 $\mu$m. The hold-up of this filter is about 4.9 liter.

DETAILED DESCRIPTION

Experiment 1

Conventionally neutralised and bleached sunflower oil containing about 500 ppm wax was dried to a water content of preferably less than 0.05% by wt, and was heated to about 80° C. to ensure that any wax crystals were dissolved. Thereafter, the oil is subjected to two different cooling conditions, namely crash cooling and slow cooling according to the invention.

Crash cooling is done in one single cooling step at a cooling rate of about 120° C. per hour at an initial temperature difference of about 110° C. between the oil to be dewaxed and the coolant medium.

Slow cooling according to the invention comprises a first cooling step, in which the oil is quickly cooled to the solubility temperature of the wax present in the oil (about 45° C.), and a second cooling step, comprising a cooling rate of 6° C. per hour and a maximum temperature difference between the oil and the coolant medium of 8° C. The oil end temperature was 8° C.

The oil/crystallized wax slurry obtained was immediately microfiltered without any additional maturation time. If the viscosity of the oil is too high for proper handling, the viscosity of the slurry is lowered by quickly raising the temperature of the slurry, generally to less than 30° C., preferably to 15°–25° C., so that dissolving of wax crystals is minimized; this is confirmed by the cold test.

A maximum flux value is reached after some minutes and is taken as the initial flux, because during the first minutes of microfiltration the flux is influenced by filling up the filter modules.

During microfiltration wax crystals are accumulated on the microfilter, resulting in a decrease of the flux rate.

The flux values are reviewed in the accompanying table 1.

Samples of the dewaxed oil obtained after microfiltration are subjected to the cold test. The samples were filled in 100 ml. DURAN-SCHOTT GL45 bottles, stored in melting ice/water for 24 or 48 hours.

The samples of the oil subjected to slow cooling were brilliant after the cold test, whereas the samples of the oil subjected to crash cooling were turbid.

Experiment 2

In this experiment the influence of the water content on the flux rate during microfiltration is shown.

Samples of neutralized and bleached sunflower disclosed in experiment 1 were dried to various water contents, 0.50, 0.25 and 0.07% by wt respectively, thereafter slowly cooled according to the invention and subjected to microfiltration using the MICROZA TP-113 microfilter at a transmembrane pressure of 2 bar.

The results are summarized in table 2, and show that after 30 minutes microfiltration the initial flux rate and the flux rate decrease with an increase in water content of the oil.

The dewaxed oils having a water content of 0.25 and 0.07% by wt both passed the cold test.

TABLE 2

| water content [% by wt] | initial flux rate (after 5 min. microfiltration) [l/m² · h] | flux rate after 30 min. microfiltration [l/m² · h] |
|---|---|---|
| 0.07 | 16.8 | 14.1 |
| 0.25 | 15.2 | 11.4 |
| 0.50 | 9.6 | 10.4 |

TABLE 1

| microfilter | initial (l/m² · h) crash cooling | initial (l/m² · h) slow cooling | after 60 min. (l/m² · h) crash cooling | after 60 min. (l/m² · h) slow cooling |
|---|---|---|---|---|
| MICROZA TP-113 ® [1] | 5.8 | 8.7 | 4.9 | 6.2 |
| LOEFFLER ® [2] | 30 | 155 | 4.2 | 28 |

Note:
[1] transmembrane pressure 1.5 bar
[2] transmembrane pressure 3 bar

We claim:
1. A method for dewaxing oil, comprising the steps of:
  i) drying the oil to a water content of less than 0.5% by wt;
  ii) heating the oil to a temperature at which the oil does not contain nucleation seeds for wax crystal formation;
  iii) cooling the dried oil from the temperature at which it does not contain nucleation seeds for wax crystal formation, at a cooling rate of less than 15° C. per hour and at a temperature difference between the oil and the coolant medium of less than 15° C., to an oil end temperature being in the range of 2°–10° C. wherein a solid wax is formed; and
  iv) removing the solid wax by microfiltration.

2. The method as claimed in claim 1, wherein the water content of the dried oil is less than 0.30% by wt.

3. The method as claimed in claim 1, wherein the water content of the dried oil is less than 0.1% by wt.

4. The method as claimed in claim 1, wherein the heating of the oil occurs during drying.

5. The method as claimed in claim 1, wherein the heating of the oil, after drying occurs after drying.

6. The method as claimed in claim 1, wherein the cooling rate is equal to or less than 10° C. per hour.

7. The method as claimed in claim 1, wherein the temperature difference between the oil and the coolant medium is equal to or less than 10° C.

8. The method as claimed in claim 1, wherein the oil end temperature is in the range of 5°–8° C.

9. The method as claimed in claim 1, wherein after reaching the oil end temperature, the cooled oil is directly microfiltered without allowing maturation.

* * * * *